(12) United States Patent  
Worre et al.

(10) Patent No.: US 11,996,012 B2  
(45) Date of Patent: *May 28, 2024

(54) 360 DEGREE INTERACTIVE STUDIO

(71) Applicant: Better Way Productions LLC, Las Vegas, NV (US)

(72) Inventors: Eric Worre, Las Vegas, NV (US); Marina Worre, Las Vegas, NV (US)

(73) Assignee: Better Way Productions LLC, Las Vegas, NV (US)

( * ) Notice: Subject to any disclaimer, the term of this patent is extended or adjusted under 35 U.S.C. 154(b) by 278 days.

This patent is subject to a terminal disclaimer.

(21) Appl. No.: 17/547,010

(22) Filed: Dec. 9, 2021

(65) Prior Publication Data

US 2022/0246070 A1  Aug. 4, 2022

Related U.S. Application Data

(63) Continuation-in-part of application No. 17/166,416, filed on Feb. 3, 2021, now Pat. No. 11,431,920.

(51) Int. Cl.
| | | |
|---|---|---|
| *H04N 5/262* | (2006.01) | |
| *G09F 9/302* | (2006.01) | |
| *G09F 19/02* | (2006.01) | |

(52) U.S. Cl.
 CPC ............ *G09F 19/02* (2013.01); *G09F 9/3026* (2013.01)

(58) Field of Classification Search
None
See application file for complete search history.

(56) References Cited

U.S. PATENT DOCUMENTS 5,703,955 A  12/1997  Fels  
6,264,330 B1 *  7/2001  Walton .................. F16M 11/08  
104/243

(Continued)

FOREIGN PATENT DOCUMENTS

| IN | 210295727 U | 4/2020 |
| JP | 2009224832 A | 10/2009 |
| KR | 20180052496 A | 5/2018 |

OTHER PUBLICATIONS

International Searching Authority, International Search Report and the Written Opinion, May 13, 2022.

(Continued)

*Primary Examiner* — Duc Nguyen  
*Assistant Examiner* — Assad Mohammed  
(74) *Attorney, Agent, or Firm* — Kirton McConkie; Brian Tucker

(57) ABSTRACT

A 360 degree interactive studio can include an arrangement of screens that enclose a performance area. The screens can be used to display an audience around the performance area and can provide an opening through which performers can enter the performance area. A 360 degree arrangement of speakers can be used to project audio of the displayed audience into the presentation area. A 360 degree arrangement of lighting can also be used to illuminate the performance area. In this way, the 360 degree interactive studio can create a live event environment for the performers and the audience even though the audience is remotely located. At least one screen of the 360 degree interactive studio can be movable. A movable screen can also be used independent of a 360 degree interactive studio.

21 Claims, 12 Drawing Sheets

(56) References Cited

U.S. PATENT DOCUMENTS

| | | |
|---|---|---|
| 10,080,088 B1 | 9/2018 | Yang |
| 2006/0269072 A1 | 11/2006 | Mao |
| 2011/0214359 A1* | 9/2011 | Magpuri .................. A47C 1/12 |
| | | 52/9 |
| 2013/0327913 A1 | 12/2013 | Fruhm |
| 2014/0230340 A1* | 8/2014 | Fox ........................... E04H 3/26 |
| | | 52/7 |
| 2014/0235362 A1 | 8/2014 | Fox et al. |
| 2015/0026714 A1 | 1/2015 | Yuan et al. |
| 2016/0144290 A1 | 5/2016 | Foote |
| 2016/0163018 A1* | 6/2016 | Wang ........................ G06T 1/20 |
| | | 345/504 |
| 2016/0271503 A1 | 9/2016 | De-Gol |
| 2017/0237788 A1 | 8/2017 | Xi et al. |
| 2020/0275060 A1 | 8/2020 | Emde |

OTHER PUBLICATIONS

TOURGO (Your Best Solution Provider), "TourGo DMX 512 Aluminum Rotating Lighting Circle Truss," website, last accessed Mar. 7, 2022, <https://www.tourgosolution.com/circular-lighting-truss/tourgo-dmx-512-aluminum-rotating-lighting-circle-truss.html>.

* cited by examiner

360 DEGREE INTERACTIVE STUDIO

CROSS-REFERENCE TO RELATED APPLICATIONS

This application is a continuation-in-part of U.S. patent application Ser. No. 17/166,416 which was filed on Feb. 3, 2021.

BACKGROUND

Studios are used to produce a variety of content. For example, a studio could be used to produce a motion picture, a sitcom, a game show or a news program. Studios are generally preferred when providing such content because they enable a high degree of control over the production. Although some studios may be configured to enable audience participation, such participation is limited and highly controlled. In contrast, live events such as concerts, sporting events, plays, conventions, and conferences are hosted in dedicated arenas, stadiums, theaters, convention centers, etc. where a large audience may gather and even participate in the event.

BRIEF SUMMARY

The present invention is directed to 360 degree interactive studios and corresponding systems, methods and computer program products. A 360 degree interactive studio can include an arrangement of screens that enclose a performance area. The screens can be used to display an audience around the performance area and can provide an opening through which performers can enter the performance area. A 360 degree arrangement of speakers can be used to project audio, such as of the displayed audience, into the presentation area. A 360 degree arrangement of lighting can also be used to illuminate the performance area. In this way, the 360 degree interactive studio can create a live event environment for the performers and the audience even through the audience is remotely located. At least one screen of the 360 degree interactive studio can be movable. A movable screen can also be used independent of a 360 degree interactive studio.

In some embodiments, the present invention may be implemented as a 360 degree interactive studio that includes: a first pair of opposing curved screens; opposing openings formed between the first pair of opposing curved screens; a second pair of opposing curved screens that are positioned overtop the opposing openings; and a performance area located within the first pair and second pair of opposing curved screens. At least one of the first pair of opposing curved screens or the second pair of opposing curved screens is a movable curved screen.

In some embodiments, the present invention may be implemented as a 360 degree interactive studio that includes: a first curved screen positioned along a first portion of a common circle, the first curved screen being movable away from the common circle; a second curved screen positioned along a second portion of the common circle; a first opening that extends along the common circle between the first curved screen and the second curved screen; a second opening that extends along the common circle between the first curved screen and the second curved screen; a third curved screen that is positioned outside of and spans the first opening; a fourth curved screen that is positioned outside of and spans the second opening; and a performance area positioned within the first, second, third and fourth curved screens.

In some embodiments, the present invention may be implemented as a studio that includes a first curved screen having a plurality of rollers and tracks formed along a floor of the studio. The plurality of rollers roll along the tracks to move the first curved screen.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
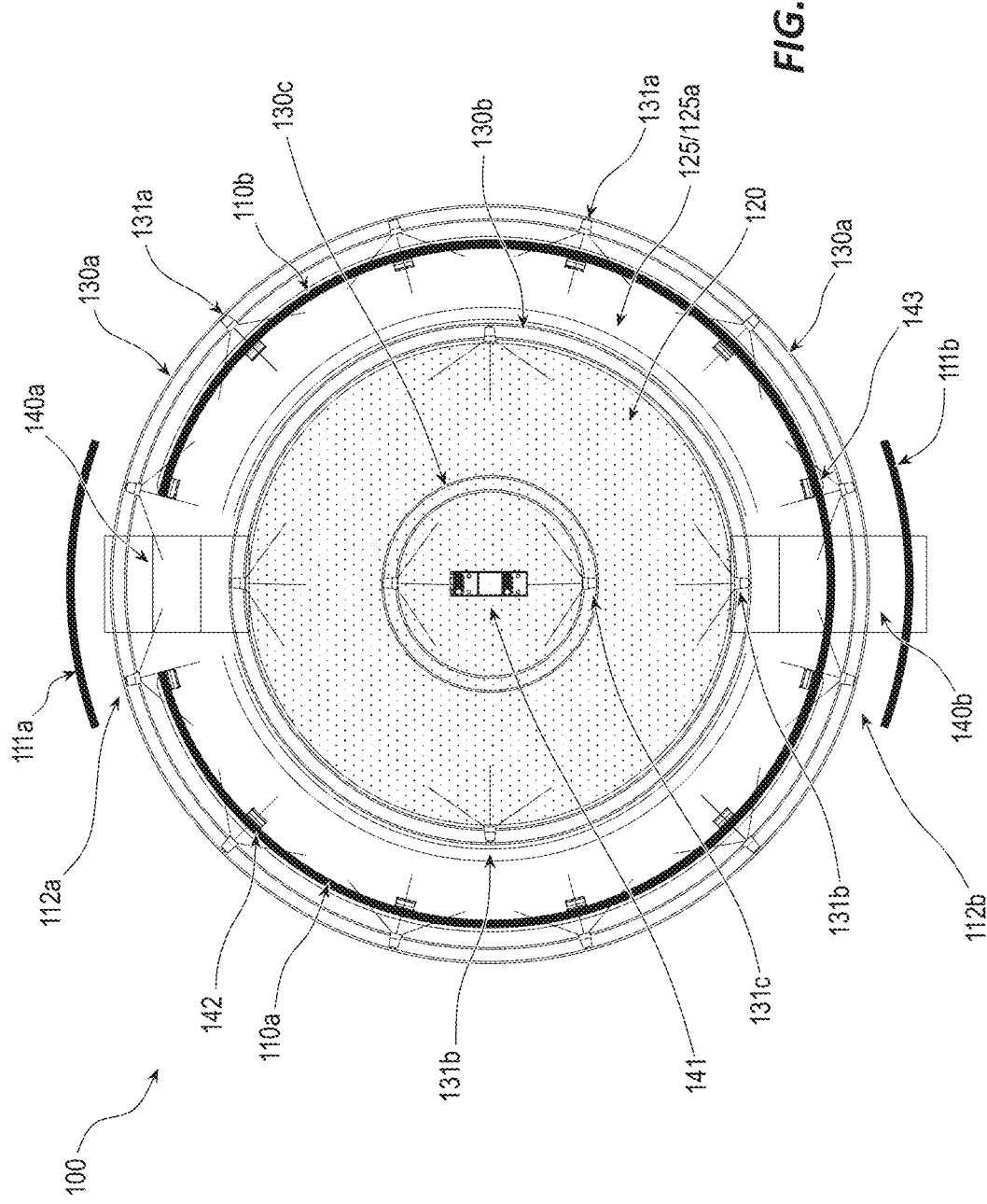
FIG. 1A provides an example of a 360 degree interactive studio that is configured in accordance with one or more embodiments of the present invention.

FIG. 1A provides an example of a 360 degree interactive studio 100 (or "studio 100") that is configured in accordance with one or more embodiments of the present invention. Studio 100 includes a 360 degree arrangement of screens formed by a first pair of opposing curved screens (or displays) 110a and 110b and a second pair of opposing curved screens (or displays) 111a and 111b which surround a performance area 120. Screens 110a and 110b can be nearly semi-circular and positioned to extend along the circumference of a common circle to thereby form opposing openings 112a and 112b between screens 110a and 110b. Accordingly, openings 112a and 112b can also extend along the circumference of the common circle such as, for example, along 30 degrees of the common circle in which case each screen 110a and 110b would extend along 150 degrees of the common circle.

The term "common circle" shall be construed as a circle having a circumference on which screens 111a and 111b extend. In some embodiments, the diameter of the common circle may be between 50 feet and 60 feet such as approximately 56 feet. The term "approximately" as used in this specification and the claims shall be construed as encompassing the stated measurement plus or minus 15 percent.

Screens 111a and 111b can be aligned overtop openings 112a and 112b respectively but spaced outwardly from the circumference of the common circle to thereby allow performers to pass in front of screens 111a and 111b to reach openings 112a and 112b respectively. As shown, screens 111a and 111b may be equally spaced from the circumference of the common circle, but they need not be. Because screens 111a and 111b are aligned with openings 112a and 112b, screens 111a and 111b may appear as extensions of screens 110a and 110b thus creating the appearance of a 360 degree screen from performance area 120. In embodiments where the common circle has a diameter of approximately 56 feet, screens 111a and 111b may be positioned along the circumference of a circle having a diameter of approximately 63 feet. In other words, screens 111a and 111b may be spaced approximately 3.5 feet from screen 110a and 110b.

Screens 110a and 110b may be positioned on or immediately above floor 130. In some embodiments, performance area 120 may be elevated relative to floor 130 thereby created a ring-shaped floor region 130a surrounding performance area 120. In such cases, ramps or stairs 140a and 140b may be provided at openings 112a and 112b respectively.

A plurality of circular truss structures 130a, 130b and 130c can be positioned above performance area 120 and may be used to support lighting units 131a, 131b and 131c respectively and/or other electronic components in circular arrangements above performance area 120. Each of truss structures 130a, 130b and 130c may be arranged concentrically relative to the common circle. Truss structure 130a may be in the form of a circle having a diameter that is slightly larger than that of the common circle such that lighting units 131a are positioned radially outward from screens 110a and 110b. In some embodiments, the circle along which truss structure 130a extends may be positioned between the common circle and a circle along which screens 111a and 111b are positioned.

Truss structure 130b may be in the form of a circle having a diameter that generally matches the diameter of performance area 120 (e.g., when performance area 120 is in the shape of a circle) or that generally align with the outer edges of performance area 120 (e.g., when performance area 120 is not in the shape of a circle). Truss structure 130c may be in the form of a circle having a diameter smaller than the diameter of performance area 120. Any suitable number of lighting units 131a, 131b and 131c may be supported from truss structures 130a, 130b and 130c respectively to light performance area 120, and embodiments of the present invention should not be limited to the number of lighting units shown in FIG. 1A.

Figure 1B:
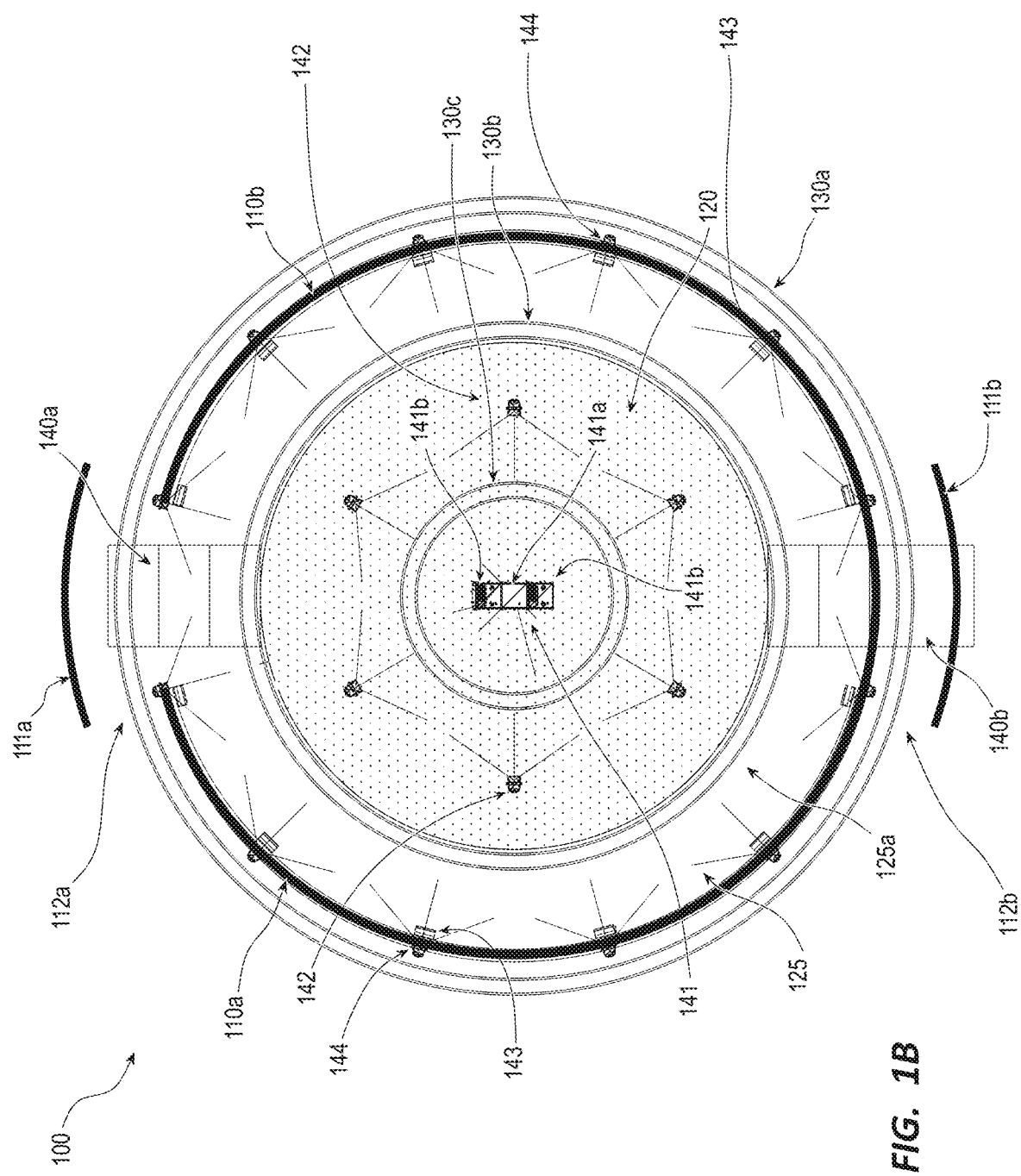
FIG. 1B provides another example of a 360 degree interactive studio.

As best represented in FIG. 1B, a number of audio components can be supported from truss structures 130a, 130b and/or 130c (or other supporting structure) to project audio to performance area 120. For example, a low frequency audio assembly 141 may be supported from truss structure 130c above a center point of the common circle. In some embodiments, low frequency audio assembly 141 can include a center subwoofer 141a and two side subwoofers 141b positioned on opposing sides of the center subwoofer 141a. In some embodiments, center subwoofer 141a may be oriented upwardly while side subwoofers 141b may be oriented downwardly.

A number of loudspeakers 142 may be supported between truss structures 130b and 130c above performance area 120. In some embodiments, six loudspeakers 142 may be equally spaced (e.g., every 60 degrees) around a circle that is concentric with the common circle and may be oriented towards the center point of the common circle (e.g., oriented downwardly at an angle of approximately 44 degrees). In some embodiments, loudspeakers 142 may be positioned along the circumference of a circle that has half the diameter of the common circle (i.e., loudspeakers 142 can be positioned at a midpoint between the center of performance area 120 and screens 110a and 110b).

A number of loudspeakers 143 may be positioned on floor 130 directly in front of screens 110a and 110b. In some embodiments, twelve loudspeakers 143 may be equally spaced (e.g., every 30 degrees) along the common circle. A number of loudspeakers 144 may be supported from truss structure 130a above screens 110a and 110b. In some embodiments, twelve loudspeakers 144 may be equally spaced (e.g., every 30 degrees) along the common circle and may be oriented towards the center point of the common circle (e.g., oriented downwardly at an angle of approximately 12 degrees).

With the 360 degree arrangement of audio components depicted in FIG. 1B, audio from the audience displayed on screens 110a, 110b, 111a and 111b can be projected to performers in performance area 120 to simulate a live event environment in which the audience physically surrounds the performers. By approximating a live audience event environment, the combination of the 360 degree projection of the audio with the 360 degree visual display of the audience can motivate performers to provide better performances than they otherwise would during a virtual event.

Figure 1C:
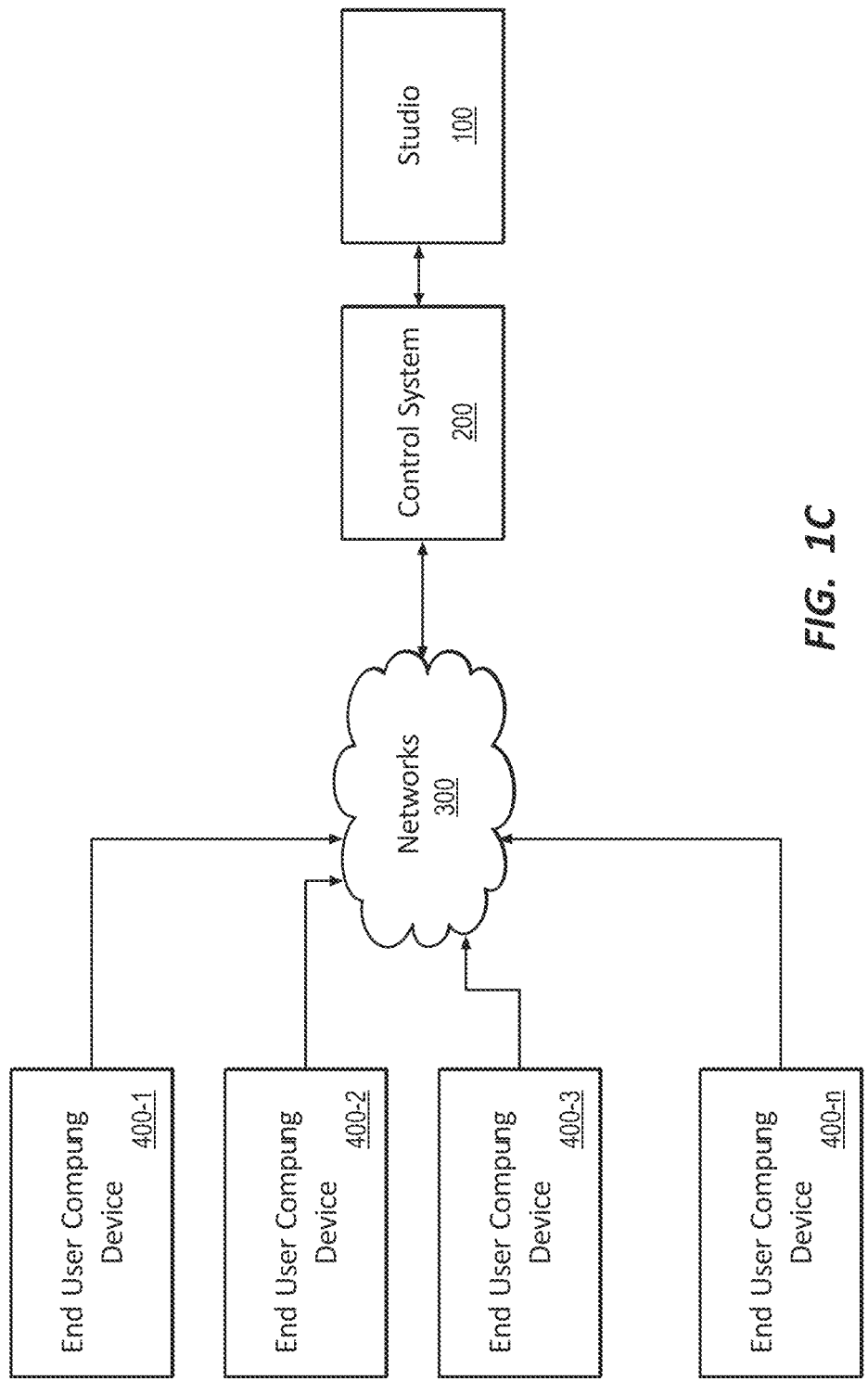
FIG. 1C provides an example of a networking environment in which a 360 degree interactive studio may be used.

FIG. 1C provides an example of a networking environment in which studio 100 may be used. As shown, studio 100, or more particularly, the components of studio 100, can be connected to a control system 200 via a wired or wireless interface. Control system 200 can be connected to a number of end user computing devices 400-1 through 400-n (generally "computing device(s) 400") via networks 300. Networks 300 can typically represent the internet, but any suitable network connection could be used to interconnect control system 200 to any particular end user computing device 400.

Control system 200 can include a number of computing systems or other control components for processing audio and video content that may be generated within studio 100 and that may be displayed/output in studio 100. For example, a number of microphones and cameras may be employed within studio 100 to capture audio and video content of a performance. Control system 200 can include components for processing and streaming this audio and video content to end user computing devices 400 to enable the audience to view the performance. Control system 200 can also include components for receiving audio and video content of the audience from end user computing devices 400 and then processing and outputting the content within studio 100. For example, control system 200 can include components for aggregating video content received from end user computing devices 400, such as video of some or all of the members of the audience, into a form that can be presented on screens 110a, 110b, 111a and 111b. Similarly, control system 200 can include components for mixing audio content received from end user computing devices 400, such as audio of some or all of the members of the audience, for output to the audio components of studio 100. Control system 200 can include functionality to enable a producer to dynamically select how such content received from end user computing devices 400 is rendered within studio 100. For example, control system 200 could enable a producer to select only audio from a particular end user computing device 400 to be output in studio 100 or to select video from a particular end user computing device 400 to be displayed on a particular screen or portion of screen 110a, 110b, 111a and/or 111b.

In some embodiments, control system 200 may also include components for moving one or more of screens 110*a*, 110*b*, 111*a* or 111*b*. For example, one of screens 110*a* or 110*b* could include a mechanism by which the screen may be lifted above floor 130 or pivoted away from the common circle. In such cases, control system 200 can provide functionality for selectively actuating such a mechanism to provide a larger entrance into performance area 120 (e.g., to bring a large prop or equipment into performance area 120). In embodiments where performance area 120 may be raised relative to floor 130, control system 200 may also include functionality for lowering performance area 120 to floor 130. Similarly, one or both of screens 111*a* or 111*b* may include a mechanism by which the screen may be lifted or pivoted to provide a larger entrance into performance area 120.

Figure 2A:
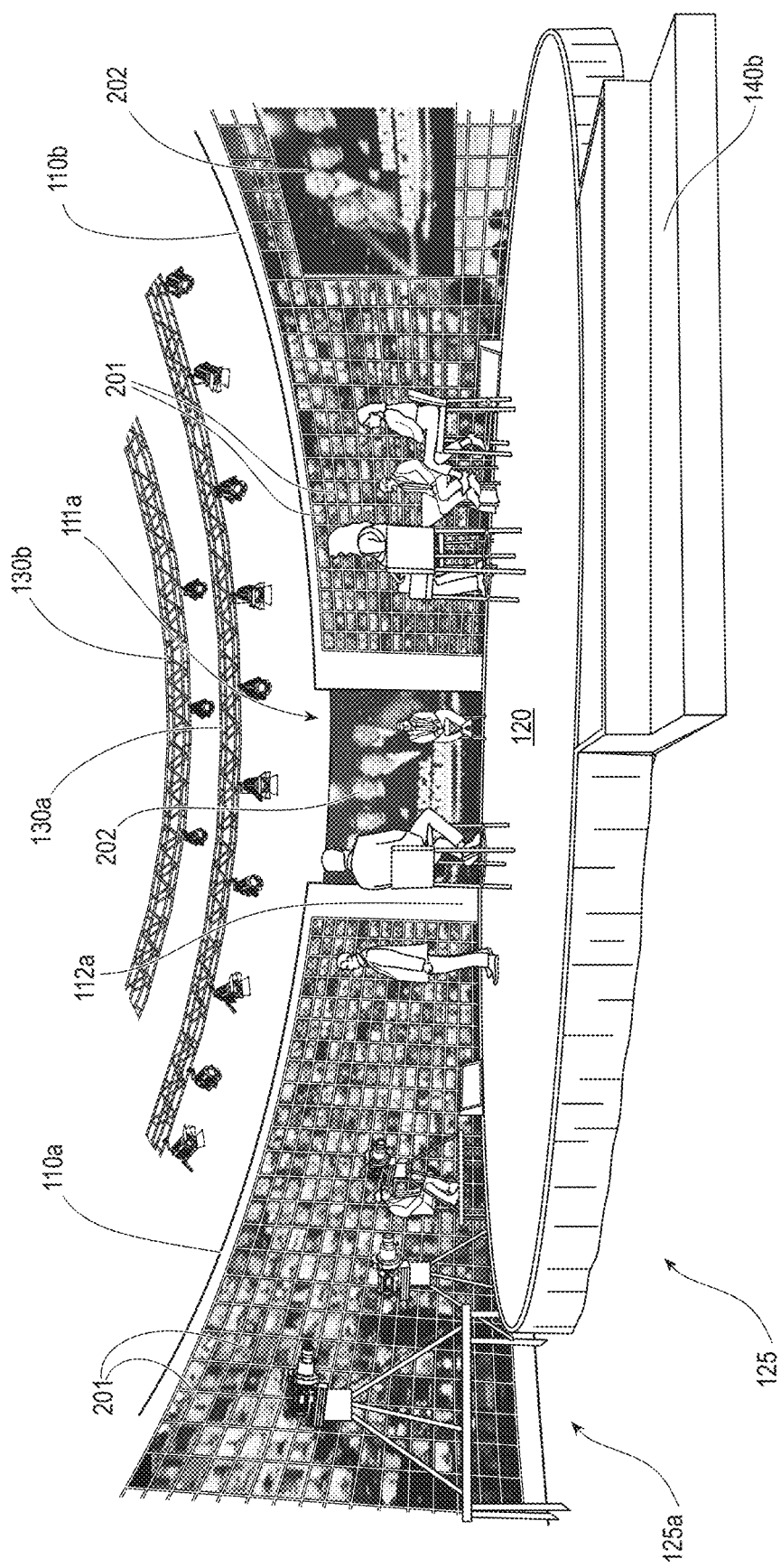
FIGS. 2A-2E provide various views of a 360 degree interactive studio that is configured in accordance with one or more embodiments of the present invention.

FIGS. 2A-2E each provide a different view of studio 100. In FIG. 2A, studio 100 is being used to host a live discussion with a number of performers and an interactive audience. As shown, screens 110*a* and 110*b* can be used to display an aggregation of audience streams 201 around the performers to create the appearance that the performers are surrounded by an in person audience. Also screen 111*a* and a portion of screen 110*b* can be used to display a representation of the event separately from audience streams 201. Notably, the cameras within studio 100 can capture both the performers and whatever is displayed on screens 110*a*, 110*b*, 111*a* and 111*b* so that the video content streamed to the audience can best approximate the visual experience of attending the event in person. Likewise, the microphones within studio 100 may capture audio within studio 100 including whatever the performers may say and possibly audio content output by the audio components of studio 100 so that the audio content streamed to the audience can best approximate the audio experience of attending the event in person.

Figure 2B:
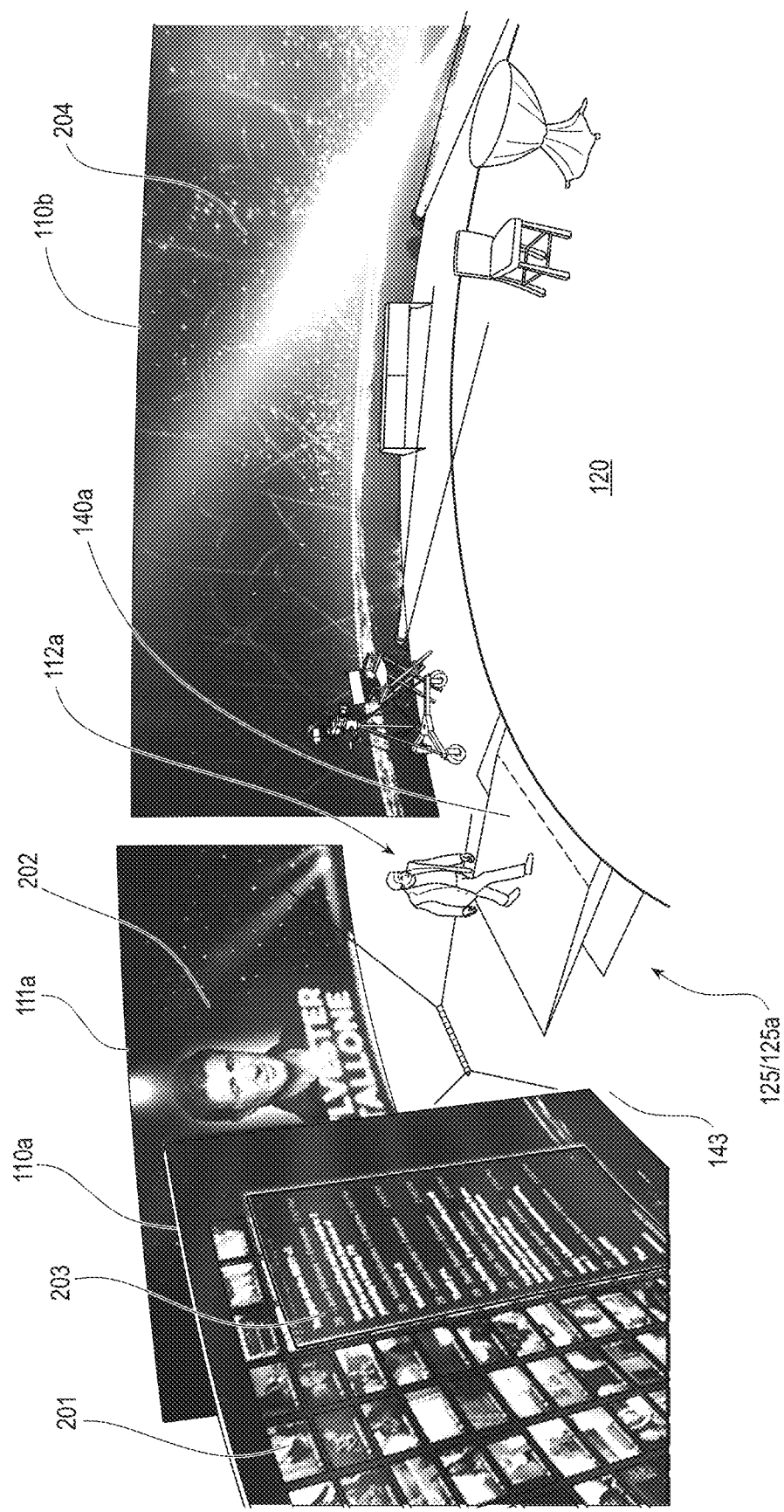

FIG. 2B provides an example of how a performer may enter performance area 120 via opening 112*a* and ramp 140*a*. As shown, during the performer's entrance, screen 110*a* can display an aggregation of audience streams 201 while screen 110*b* may display a visual effect 204. A representation 202 of the performer may be displayed on screen 111*a*. FIG. 2B also shows that screen 110*a* may be used to display an audience chat area 203 to thereby enable the audience to interact with the performer.

Figure 2C:
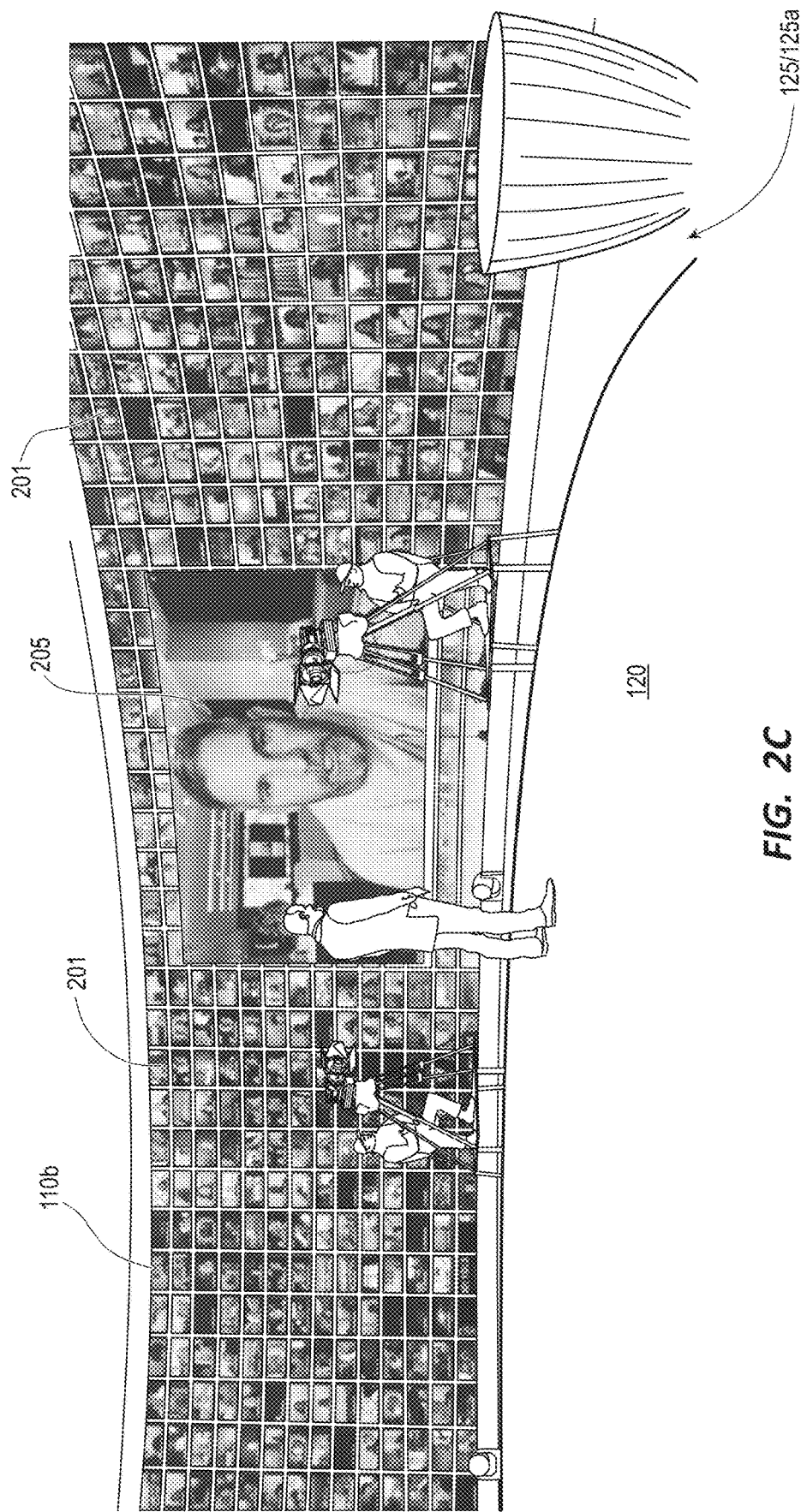

FIG. 2C provides an example where screen 110*b* is used to present a video stream 205 of a remote performer that is surrounded by an aggregation of audience streams 201. A performer in performance area 120 can face screen 110*b* to interact with the remote performer. During this interaction, cameras and microphones can capture video and audio from within studio 100 and control system 200 can process and stream the video and audio content to end user computing devices 400. In some embodiments, control system 200 may provide a video stream to a particular end user computing device 400 that is generated by a camera that is positioned in front of the area of screen 110*a* or 110*b* where the audience member's stream is displayed. In other words, control system 200 can provide a video stream representing what the audience member would see if the audience member where physically present in studio 100 at the location where his or her stream is currently displayed.

Figure 2D:
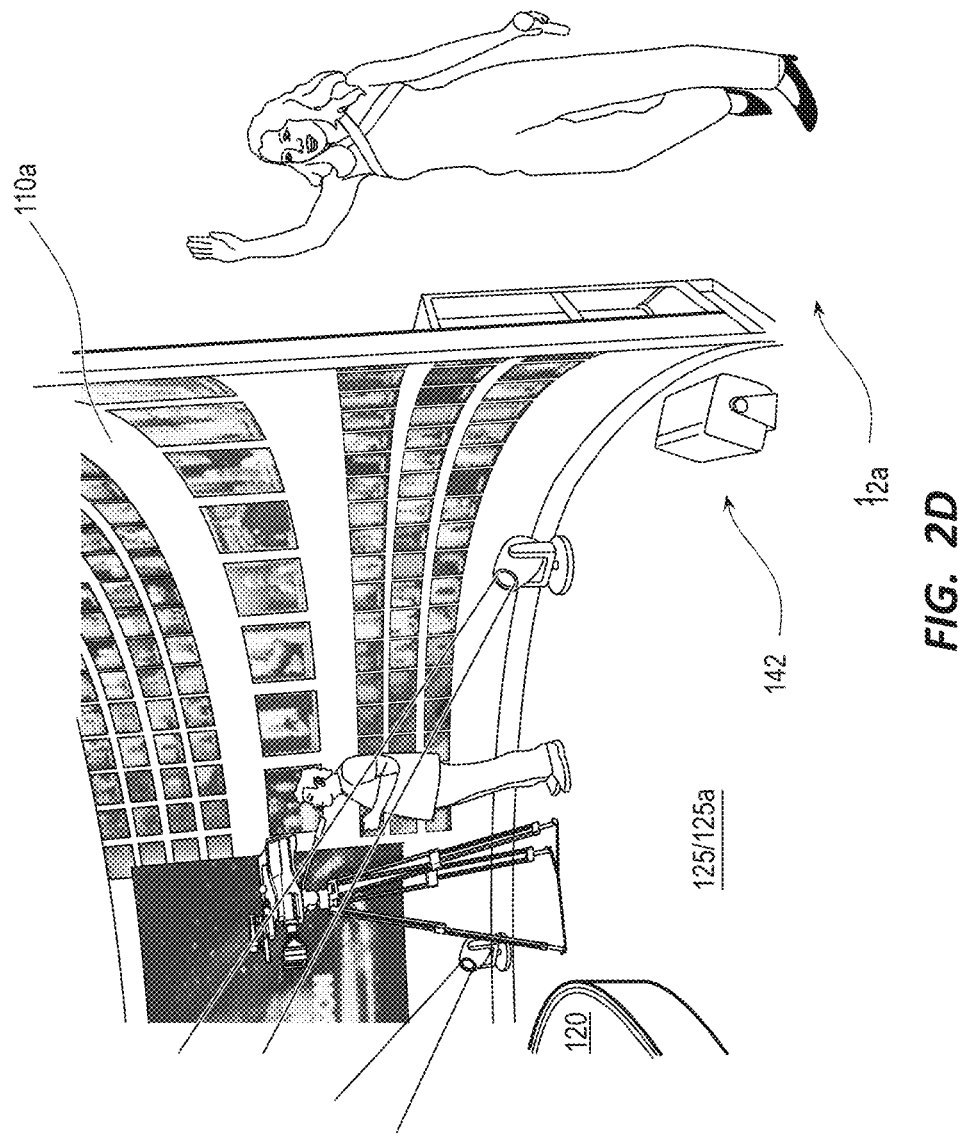

FIG. 2D provides an example where a performer is approaching entrance 112*a* between screen 110*a* and screen 111*a*. As mentioned above, in some embodiments, screen 110*a* and/or screen 111*a* may include a mechanism that enables the screen to be lifted or pivoted to thereby create a larger entrance to floor 130 and performance area 120. For example, if a prop is too large to fit between screen 110*a* and screen 111*b*, either screen could be lifted to allow the object to pass under the screen and onto performance area 120.

Figure 2E:
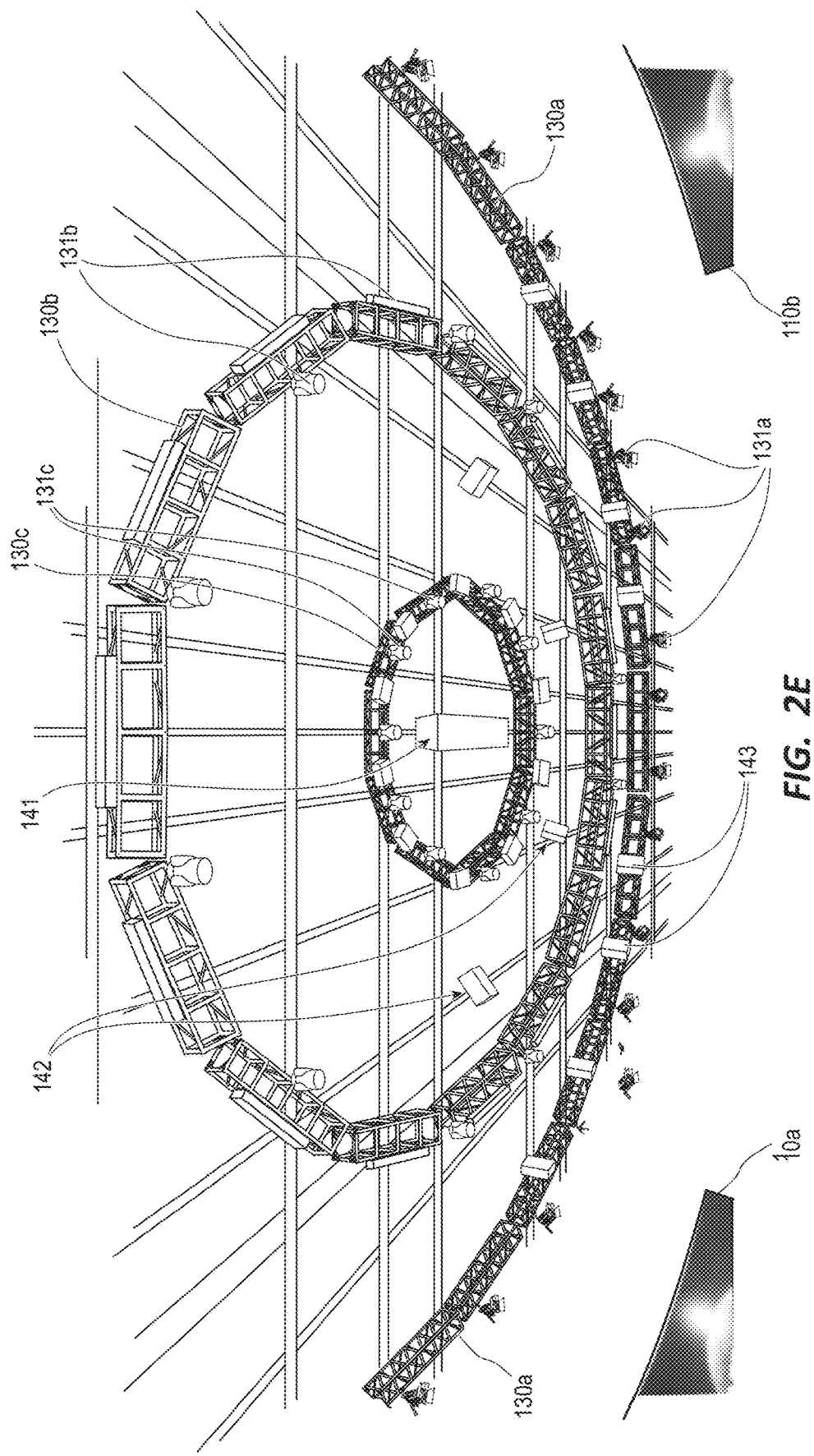

FIG. 2E provides a view looking upward from within studio 100. As shown, truss structures 130*a*-130*c* have a concentric arrangement that is centered above the center point of the common circle. Truss structure 130*c* is positioned above screens 110*a* and 110*b* and may support a number of lighting units 131*a*. Truss structure 130*b* is positioned inside of truss structure 130*c* and may also support a number of lighting units 131*b*. Truss structure 130*c* is positioned inside truss structure 130*b* and may also support a number of lighting units 131*c*. FIG. 2E also shows low frequency audio assembly 141 and loudspeakers 142 and 143.

Figure 3A:
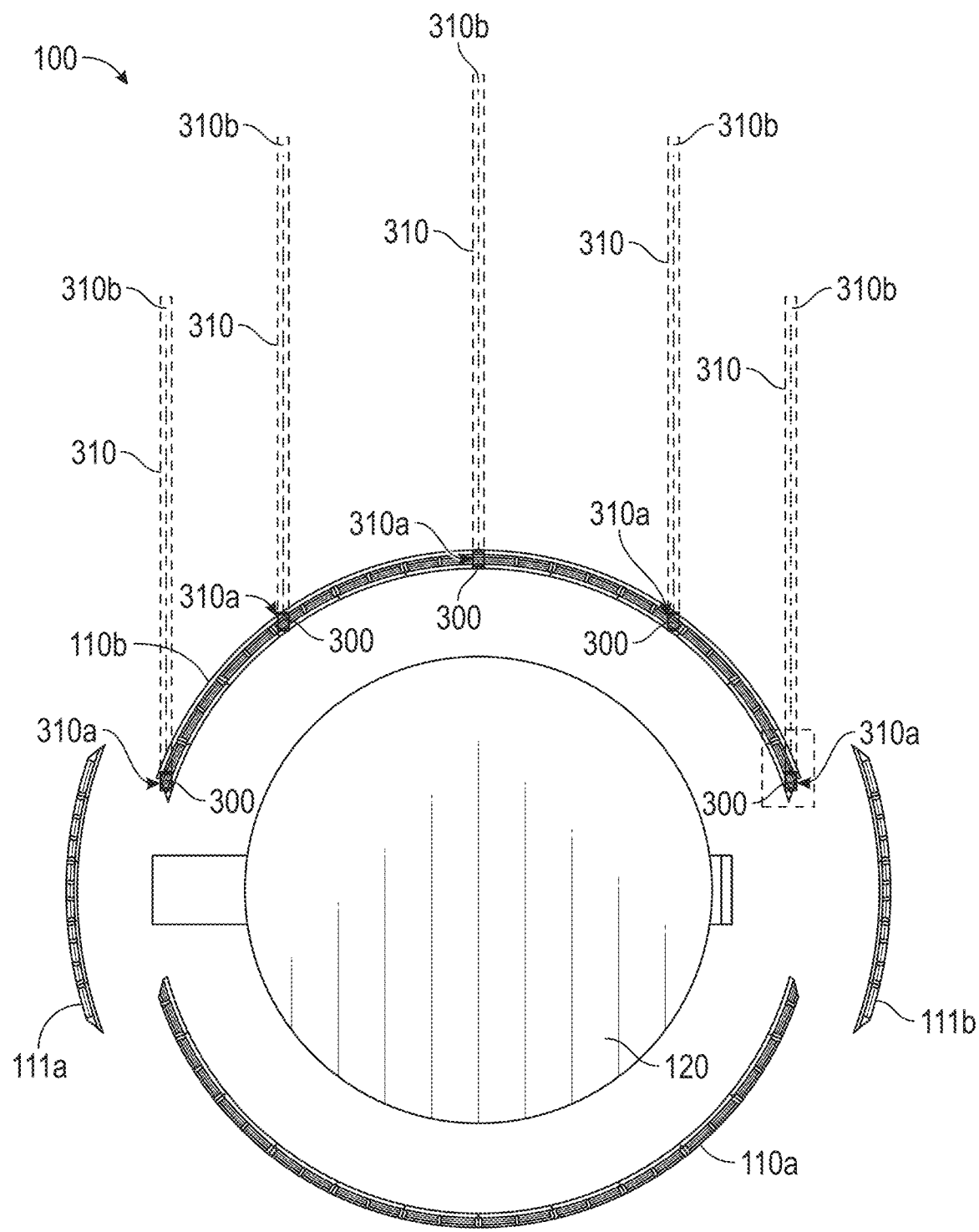
FIGS. 3A and 3B provide an example of a 360 degree interactive studio that includes a screen that is movable.
Figure 3B:
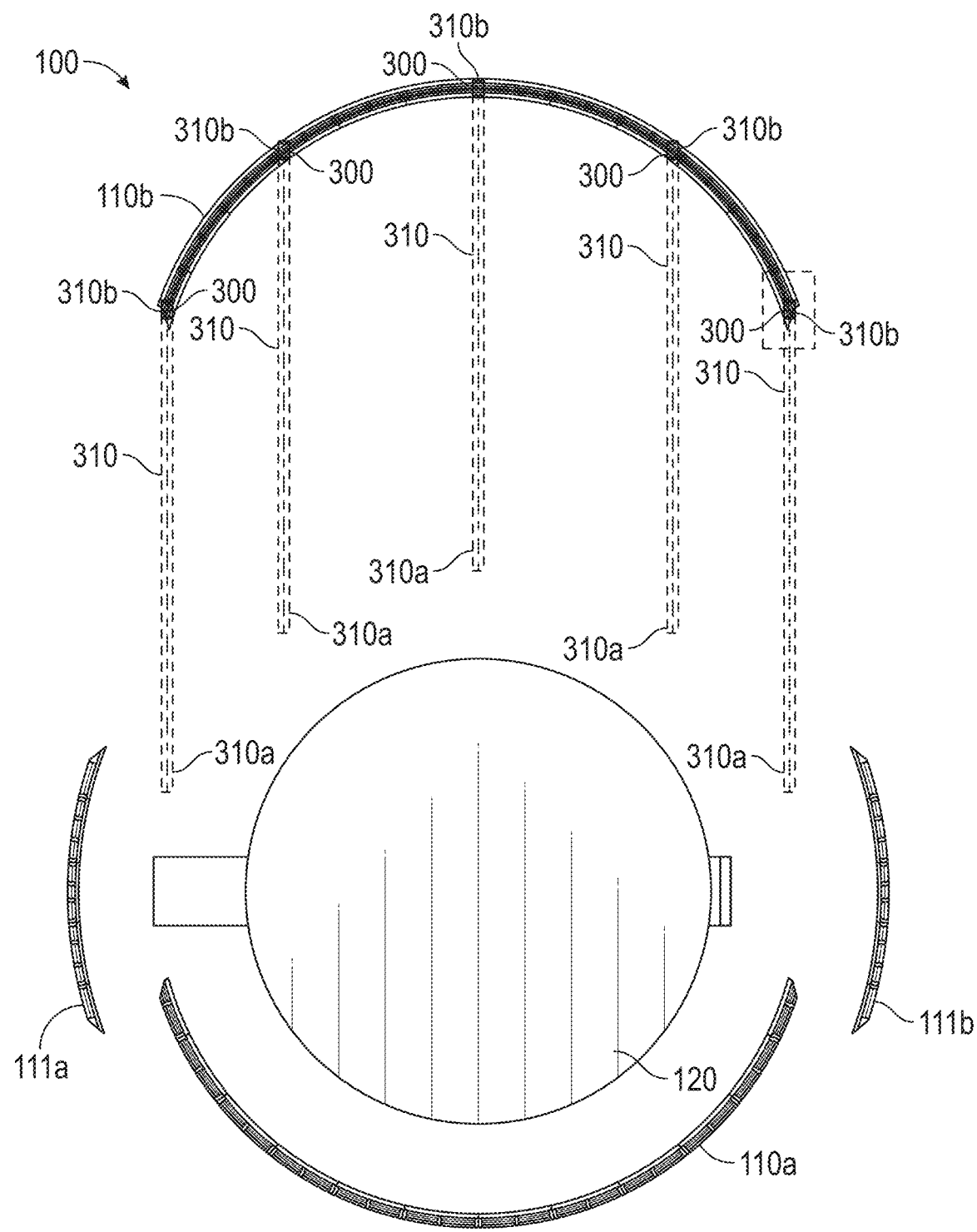
Figure 4A:
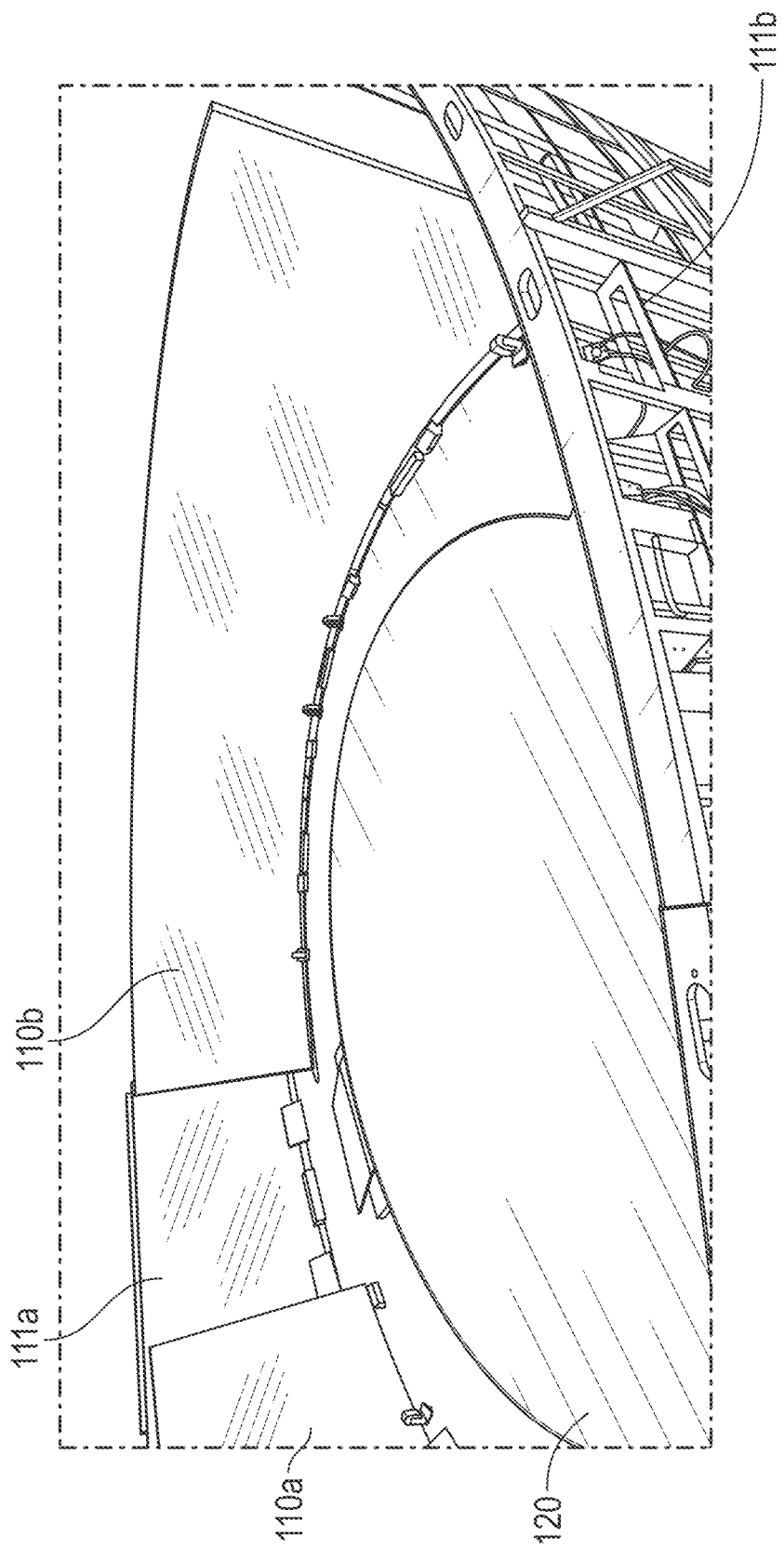
FIGS. 4A and 4B provide another example of a 360 degree interactive studio that includes a screen that is movable.
Figure 4B:
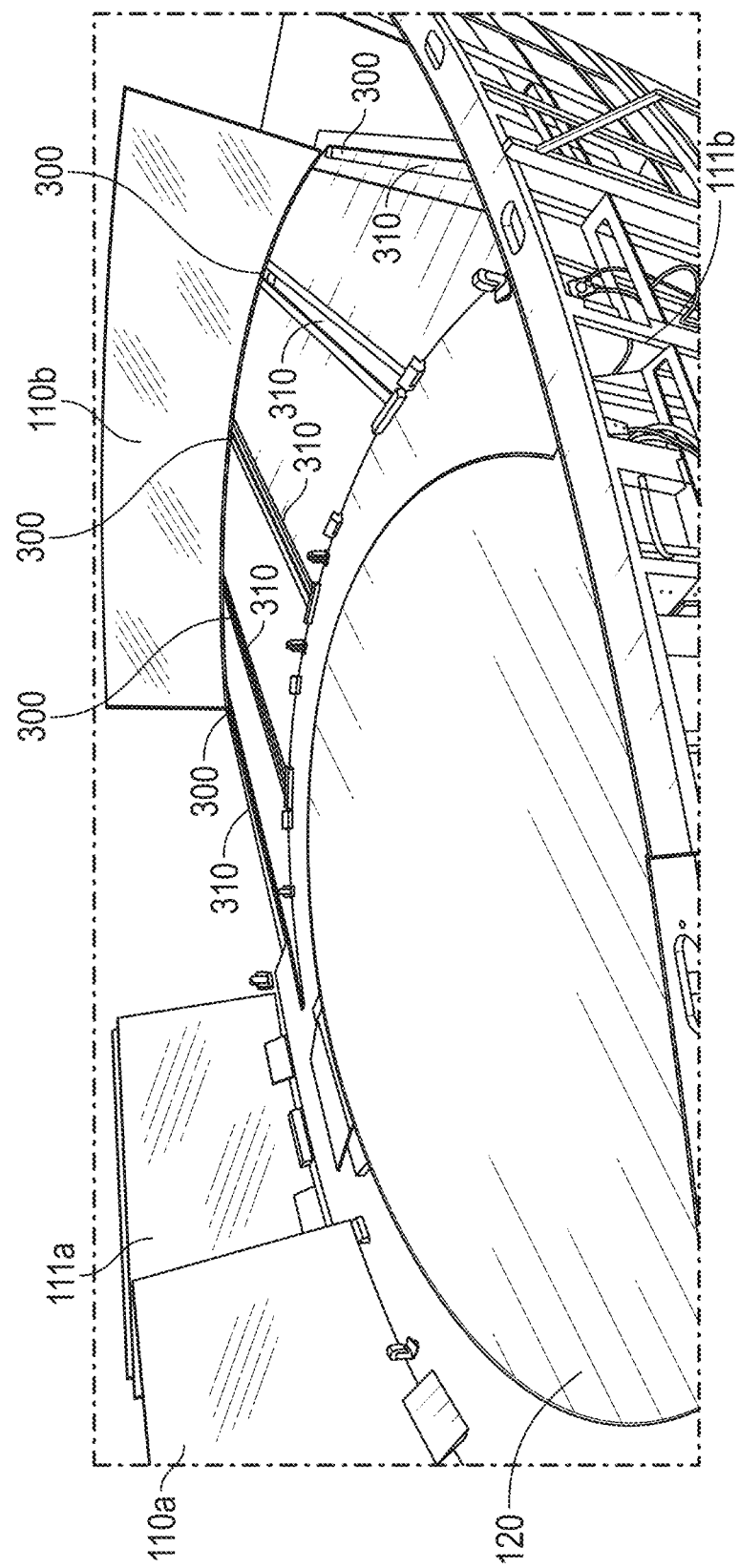

FIGS. 3A-4B provide an example of studio 100 in embodiments in which screen 110*b* is movable. FIGS. 3A and 3B are top views with screen 110*b* in the closed position and open position respectively. FIGS. 4A and 4B are perspective views with screen 110*b* in the closed position and open position respectively.

To enable screen 110*b* (or any other screen) to be movable, studio 100 may include a number of tracks 310 (e.g., five) that extend in parallel away from the common circle. In particular, each track 310 has a first end 310*a* that is positioned along the circumference of the common circle and a second end 310*b* that is spaced away from the common circle. In some embodiments, each track 310 can have the same length such as approximately 42 feet. In some embodiments, tracks 310 may be formed as recessed channels in the floor of studio 100. In other embodiments, tracks 310 could be formed as raised structures.

Screen 110*b* may include a number of rollers 300 that are attached to the bottom of screen 110*b* in alignment with tracks 310. Rollers 300 can support screen 110*b* in the upright position. In embodiments where tracks 310 are in the form of channels in the floor, rollers 300 may insert into and roll within tracks 310. In embodiments where tracks 310 are raised structures, rollers 300 may couple to and roll along tracks 310.

In some embodiments, rollers 300 may enable screen 110*b* to be manually rolled along tracks 310. In other embodiments, screen 110*b* may include one or more motors for rotating rollers 300 or otherwise causing rollers 300 to travel along tracks 310.

Tracks 310 and rollers 300 enable screen 110*b* to be quickly and easily moved a substantial distance away from the common circle. For example, as mentioned above, screen 110*b* may be moved to the open position to allow a large prop or equipment to be brought into performance area 120. By employing tracks 310 and rollers 300, screen 110*b* can be moved as a whole without creating undue stress on the structure or electronics of screen 110*b*.

Screen 110*b*, or any other screen, could also include rollers 300 that are configured to move along tracks 310 to move screen 110*b* in other studio arrangements. For example, a studio could only include screen 110*b* (i.e., a single screen) that is configured as shown in FIGS. 3A-4B to allow screen 110*b* to be moved. Accordingly, embodiments of the present invention encompass movable screens that are not part of a 360 degree studio.

In summary, a studio configured in accordance with embodiments of the present invention may include a 360 degree arrangement of screens that surround a performance area. The screens can be used to display an audience to performers in the performance area. The studio may also include a 360 degree arrangement of audio components for projecting audio of the audience into the performance area. A studio configured in this manner can enable a virtual event to approximate the environment of a live audience event, both for the performers and the audience. At least one screen of the 360 degree interactive studio can be movable. A movable screen can also be used independent of a 360 degree interactive studio.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A 360 degree interactive studio comprising:
    a first pair of opposing curved screens that extend along a circumference of a first common circle;
    opposing openings formed between the first pair of opposing curved screens such that the opposing openings also extend along the circumference of the first common circle, each of the opposing openings extending along a first number of degrees of the first common circle;
    a second pair of opposing curved screens that extend along a circumference of a second common circle that has a larger diameter than the first common circle, each of the second pair of opposing curved screens extending along a second number of degrees of the second common circle, wherein the second pair of opposing curved screens and the opposing openings have a common axis of symmetry such that the second pair of opposing curved screens are positioned overtop the opposing openings, wherein the second number is greater than the first number such that each of the second pair of opposing curved screens fully spans the respective opposing opening to thereby create an appearance that the first pair of opposing curved screens and the second pair of opposing curved screens form a 360 degree screen, wherein space between the first and second pair of opposing curved screens forms an entrance into the respective opposing openings; and
    a performance area located within the first pair and second pair of opposing curved screens;
    wherein at least one of the first pair of opposing curved screens or the second pair of opposing curved screens is retractable away from the respective first or second common circle.

2. The 360 degree interactive studio of claim 1, wherein the at least one movable curved screen includes rollers that roll along tracks.

3. The 360 degree interactive studio of claim 2, wherein the tracks are channels in a floor of the studio.

4. The 360 degree interactive studio of claim 2, wherein the tracks extend either perpendicular or parallel to the common axis of symmetry.

5. The 360 degree interactive studio of claim 4, wherein the tracks comprise five tracks and the roller comprise five rollers.

6. The 360 degree interactive studio of claim 1, wherein the at least one moveable screen comprises a first curved screen of the first pair of opposing curved screens.

7. The 360 degree interactive studio of claim 6, wherein the first curved screen includes rollers that insert into and roll within tracks to thereby move the first curved screen.

8. The 360 degree interactive studio of claim 7, wherein the tracks are at least 40 feet long.

9. The 360 degree interactive studio of claim 1, wherein the first number of degrees is 30 degrees.

10. The 360 degree interactive studio of claim 9, wherein the diameter of the first common circle is between 50 feet and 60 feet.

11. The 360 degree interactive studio of claim 1, wherein at least one of the first pair of opposing curved screens is retractable away from the first common circle, further comprising:
    tracks that extend away from the first common circle;
    wherein the at least one of the first pair of opposing curved screens includes rollers that roll along the tracks to move the at least one of the first pair of opposing curved screens away from the first common circle.

12. The 360 degree interactive studio of claim 11, wherein the tracks are channels in a floor of the studio and the rollers insert into the channels.

13. The 360 degree interactive studio of claim 11, wherein the tracks are parallel.

14. The 360 degree interactive studio of claim 11, wherein the rollers comprise at least five rollers and the tracks comprise at least five tracks.

15. The 360 degree interactive studio of claim 14, wherein the tracks are at least 40 feet long.

16. The 360 degree interactive studio of claim 15, wherein the first number of degrees is 30 degrees.

17. A 360 degree interactive studio comprising:
    a first pair of opposing curved screens that extend along a circumference of a first common circle;
    opposing openings formed between the first pair of opposing curved screens such that the opposing openings also extend along the circumference of the first common circle, each of the opposing openings extending along at least 30 degrees of the first common circle;
    a second pair of opposing curved screens that extend along a circumference of a second common circle that has a larger diameter than the first common circle, each of the second pair of opposing curved screens extending along greater than 30 degrees of the second common circle, wherein the second pair of opposing curved screens and the opposing openings have a common axis of symmetry such that the second pair of opposing curved screens are positioned overtop the opposing openings such that each of the second pair of opposing curved screens fully spans the respective opposing opening to thereby create an appearance that the first pair of opposing curved screens and the second pair of opposing curved screens form a 360 degree screen, wherein space between the first and second pair of opposing curved screens forms an entrance into the respective opposing openings; and
    a performance area located within the first pair and second pair of opposing curved screens;
    wherein at least one of the first pair of opposing curved screens or the second pair of opposing curved screens is movable away from the respective first or second common circle.

18. A 360 degree interactive studio comprising:
    a first pair of opposing curved screens that extend along a circumference of a first common circle having a diameter between approximately 50 and 60 feet;
    opposing openings formed between the first pair of opposing curved screens such that the opposing openings also extend along the circumference of the first common circle, each of the opposing openings extending along at least 30 degrees of the first common circle;
    a second pair of opposing curved screens that extend along a circumference of a second common circle that has a diameter that is at least approximately 7 feet larger than the diameter of the first common circle, each of the second pair of opposing curved screens extending along greater than 30 degrees of the second common circle, wherein the second pair of opposing curved screens and the opposing openings have a common axis of symmetry such that the second pair of opposing curved screens are positioned overtop the opposing openings such that each of the second pair of opposing curved screens fully spans the respective opposing opening to thereby create an appearance that the first pair of opposing curved screens and the second pair of opposing curved screens form a 360 degree screen, wherein space between the first and second pair of opposing curved screens forms an entrance into the respective opposing openings; and a performance area located within the first pair and second pair of opposing curved screens;

wherein at least one of the first pair of opposing curved screens or the second pair of opposing curved screens is movable away from the respective first or second common circle.

19. The 360 degree interactive studio of claim 18, wherein a first curved screen of the first pair of opposing curved screens is moveable away from the first common circle.

20. The 360 degree interactive studio of claim 19, further comprising:

tracks that extend away from the first common circular perpendicular to the common axis of symmetry;

wherein the first curved screen includes rollers that insert into the tracks.

21. The 360 degree interactive studio of claim 20, wherein the tracks are in a floor of the studio.

* * * * *